Nov. 6, 1956  W. L. RIVES  2,769,894
RARE GAS WELDING TORCH
Filed Jan. 27, 1955

INVENTOR
W. L. Rives
BY Mason, Fenwick & Lawrence
ATTORNEYS

United States Patent Office 2,769,894
Patented Nov. 6, 1956

2,769,894

RARE GAS WELDING TORCH

Walter L. Rives, Jacksonville, Fla.

Application January 27, 1955, Serial No. 484,359

7 Claims. (Cl. 219—130)

The present invention relates in general to gas shielded arc welding torches adapted to support a welding electrode with which an arc is struck with the work and to project a stream of gas in shielding relation to the arc, and more particularly to control systems for establishing and maintaining the flow of inert gas in blanketing relation to the electrode for suitable periods prior to initiation of the arc and following completion of the welding cycle.

In recent years, metal arc torches employing nonconsumable electrodes of tungsten and like materials have come into wide use in the welding trades. In such welding torches, an annular stream of an inert gas such as helium or argon is ejected from the electrode holder in blanketing or shielding relation with the exposed portion of the electrode and the arc struck between the electrode and the work.

It has been customary to manually initiate the flow of the inert gas at the time the arc is struck and to cut off the flow of the inert gas as soon as the weld is completed. However, if an arc is struck and an attempt to weld is made before the electrode and the work are blanketed by the inert gas, in which case the electrode and work are in contact with nitrogen and oxygen of the surrounding air, a defective weld and contaminated electrode will result. In order to prevent this contamination of the electrode, it has more recently become recognized that provision should be made to initiate flow of the inert gas a sufficient time prior to striking the arc to allow time for the inert gas to travel to the torch and form a protective blanket surrounding the work and the electrode to exclude the same from the nitrogen and oxygen of the surrounding air.

Also, the electrode will be damaged if the inert gas is cut off while the electrode is still hot, so that means are now incorporated to delay termination of the supply of inert gas to the torch for an extended period following termination of the arc.

It is the usual practice to initiate the flow of inert gas at a position which may be far removed from the workpiece and considerable gas is lost while the welder proceeds to the location of the work. Loss of inert gas also occurs during short intermittent stoppages, such as when the welder takes time out to position the workpiece, since the welder usually permits the inert gas to continue to flow rather than make the trip back to the location of the cut-off switch.

Accordingly, an object of the present invention is the provision of a novel inert gas-blanketed welding torch wherein means are provided to establish the flow of inert gas in blanketing relation with the electrode before an arc is struck and to maintain the blanketing flow of gas for selected periods after the arc is terminated.

Another object of the present invention is the provision of a novel arrangement in inert gas-blanketed or shielded welding torches for providing a protective blanket of inert gas around both the electrode and the work before the arc is struck and maintaining that condition for a predetermined length of time after the arc is extinguished during the cooling period of the electrode.

Another object of the present invention is the provision of a novel inert gas flow control mechanism in inert gas-blanketed welding torches for maintaining the electrode in inert gas-shielded condition before and after weld periods and during intermittent stoppage periods while the electrode is hot, which mechanism may be conveniently incorporated into standard inert gas torches without necessitating additional external wiring from the welding machine to the torch.

Another object of the present invention is the provision of a novel inert gas flow control mechanism in inert gas-blanketed welding torches wherein the voltage and current supplied to the torch may be conveniently regulated from the torch over a range to establish the inert gas shield during periods preceding and following the welding cycle and during intermittent stoppage periods.

The invention in general comprises the provision in a conventional inert gas-blanketed welding torch of an auxiliary tubular extension sleeve on the head of the torch, in which is disposed a variable resistor responsive to pressure to vary the series electrical resistance thereof, and from which sleeve a loosely supported contact member projects. The inner portion of the contact member is formed of a disc which bears upon the end of the pressure-responsive resistor, and the opposite end of the resistor is in electrical contact with the electrode and therefore with the current and voltage supply from the welding machine. By placing the contact member in contact with a grounded object or with the work, and varying the pressure thereon, current flow at a desirable low value preventing any arc at the point of contact can be obtained, thus starting the inert gas flow. Suitable relay means are provided together with variable time delay means to provide an inert gas-blanketed condition and to maintain the inert gas blanket for a suitable period after the welding arc is extinguished.

The invention will be more fully understood from the following detail description of the invention, taken in conjunction with the accompanying drawing, showing two preferred embodiments of the invention.

Figure 1:
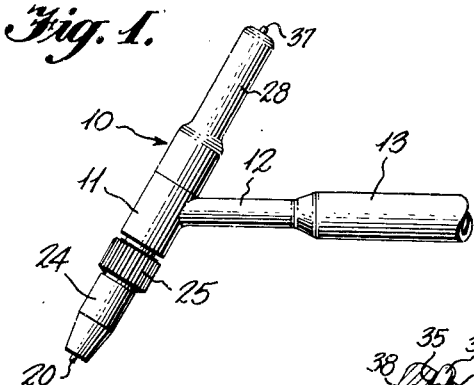
Figure 1 is a side elevation of a welding torch embodying the present invention.
Figure 2:
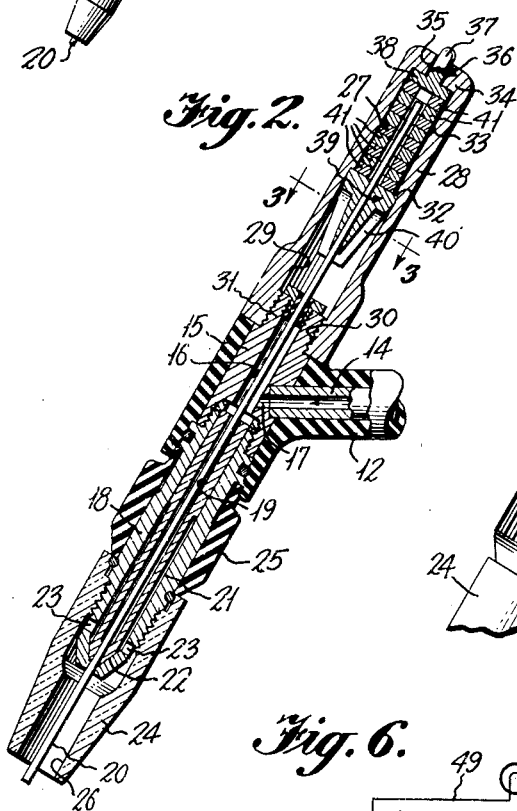
Figure 2 is a vertical longitudinal section view of the welding torch, taken along the lines 2—2 of Figure 3, and showing one preferred form of the auxiliary variable resistor head employed in the present invention.
Figure 6:
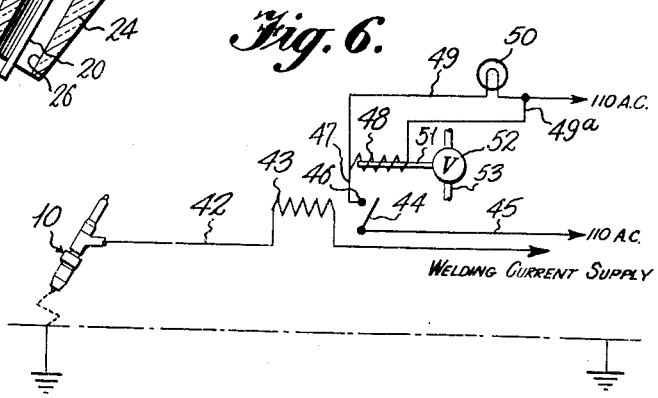
Figure 6 is a schematic electrical circuit diagram illustrating a control circuit employed with the welding torch in accordance with the present invention.

Referring to the drawing, wherein like reference characters designate corresponding parts throughout the several figures, and particularly to Figures 1, 2 and 6, the welding torch 10 comprises a hollow current and gas-supplying head 11 connected intermediate its ends at an oblique angle to the shank 12 which is provided with a handle or hand grip 13 adjacent the end thereof remote from the head 11. The shank 12 contains a metal tube 14, which in accordance with conventional practice, constitutes a welding current conductor and a gas supply conduit.

The head 11 comprises a metal cylinder 15 having an axial electrode-receiving and gas-conducting bore 16, the cylinder 15 being rigidly connected intermediate its ends to the end of the gas supply tube 14 at an oblique angle thereto. A lateral oblique bore 17 is provided in the cylinder 15 to connect the interior of the tube 14 with the head bore 16. In accordance with standard procedure, the outer surfaces of the head cylinder 15 and the conductor and conduit tube 14 are completely covered with a continuous layer of electrical insulating material.

Detachably connected to the lower end of the cylinder 15, forming the current and gas-supplying head 11, is an electrode holder barrel 18 containing a collet 19 coacting therewith to grip an electrode 20.

The barrel 18 is provided with a threaded connection with the cylinder 15, and has communicating with the head bore 16 a central axial bore 21 for accommodating the collet 19, the collet 19 being of smaller size than the bore 21 to permit shielding gas to flow freely along the collet 19 through the seat 22 for the collet 19 above which are drilled radial apertures 23 to pass shielding gas from the interior bore 21 of the barrel 18 to the interior of a gas-directing nozzle 24 threaded on the electrode holder barrel 18.

The lower end of the collet 19 is slit to form clamping jaws for holding the electrode 20 in the torch, the jaws being jammed against the electrode 20 by the interior conical seat 22 upon rotation of a fluted hand grip sleeve 25 of insulating material splined to the barrel 18. The barrel 18 is preferably made of electrically and thermally conductive material such as copper or a copper-base alloy, while the collet 19 is made of a less expensive, expendable conductive material such as carbon steel, and the nozzle is preferably formed of a ceramic material.

The nozzle 24 is provided with an interior bore 26 which communicates through the radial apertures 23, the bore 21 of the barrel 18, the axial bore 16, and the oblique bore 17 of the head 11, with the conduit and conductor tube 14 so as to eject rare inert gas such as argon, helium, and the like, in a blanketing shield about the projecting end of the electrode 20. Electric current is supplied to the electrode 20 through the metallic portion of the tube 14, the cylinder head 15, the barrel 18, and the clamping jaws of the collet 19, all in intimate physical contact with each other.

To facilitate the desired control of the electric current and shielding gas supply to the torch before and after the welding cycle and during short non-use periods, there is provided a variable resistor contact unit, generally indicated by the reference character 27, adapted to be supported on the cylinder 15 of the head 11 in oppositely extending relation to the barrel 18 and nozzle 24. The variable resistor unit 27 comprises a molded Bakelite housing 28 having an elongated interior bore 29 extending through the major portion of the length of the housing 28 and opening through the inner end thereof. The bounding surfaces of the bore 29 adjacent the open end thereof are internally threaded as indicated at 30 to permit the housing 28 to be threaded onto a threaded nipple 31 projecting from the upper end of the cylindrical portion 15 of the head 11.

The bore 29, in the embodiment shown in Figure 2, has an enlarged diameter portion adjacent the inner end thereof terminating in an annular locating shoulder 32 at approximately the longitudinal midpoint of the housing 28 and communicating with a smaller diameter portion 33 extending to the outer end of the housing 28. The smaller bore portion 33 is closed by the end wall 34 of the housing 28, which is provided with a small aperture 35 therethrough axially aligned with the bore 29.

A contact member 36 of an electrically conductive material having a pin 37 slidably seated in the aperture 35 of the end wall 34 is incorporated in the housing 28.

Integral with the pin 37 is a circular bearing plate 38 located within the bore portion 33.

Located against the annular shoulder 32 within the bore 29 is a clamping collet 39 of electrically conductive material having split jaws 40 projecting toward the head 11 and clamped securely on the portion of the electrode projecting above the head 11.

Loosely seated within the smaller diameter bore portion 33 and lying between the facing surfaces of the collet 39 and the bearing plate 38 of the contact member 36 are a plurality of stacked, annular carbon discs 41 which normally are in very light contact with each other and which may be squeezed into more intimate contact between the collet 39 and contact member 36 by pressing the contact pin 37 against a surface and thereby form a variable electric resistance between the electrode 20 and the contact member 36.

Referring particularly to Figure 6 illustrating the electrical circuit to be associated with the above described torch, an electrical supply line 42 in conductive contact with the current conductor and inert gas conduit tube 14, extends from the torch to the welding current source, which may be any of the conventional welding current machines. Inserted in series in the current supply conductor 42 at a point near the current source is a low-resistance sensitive relay 43 which is adjusted to operate on a minimum welding current and is of sufficient current capacity to accommodate maximum welding current. The contact arm 44 of the low-resistance relay 43 is directly connected with a lead 45 extending to one terminal of a 110-volt alternating current source, and the fixed relay contact 46 with respect to which the relay arm 44 is in normally open relation when no current is flowing in the relay 43, is connected by a lead 47 to the coil of a time-delay solenoid 48 and to the pilot light 50 through lead 49. The other end of the solenoid coil 48 is connected through lead 49A to the other terminal of the 110-volt source, the pilot light 50 being coupled in parallel with the coil 48. The solenoid plunger 51 extends to and controls the valve 52 disposed in the inert gas supply conduit 53 which is connected to the tube 14. The solenoid 48 is of the conventional time-delay variety having means incorporated therein for opening the inert gas supply valve 52 immediately following energization of the coil 48 and for closing the valve 52 at a preselected time following de-energization of the solenoid coil 48.

In the use of the preferred embodiment of the welding torch described above, the operator initially inverts the torch from its normal position to place the contact pin 37 of the contact member 35 against any grounded object or the workpiece, if grounded, and applies pressure thereto. An electrical circuit is thereby established from the welding current supply source through the low-resistance relay coil 43, the lead 42, the tube 14, the cylinder 15 of the head 11, the barrel 18 and the collet 19 to the electrode 20, and thence from the electrode 20 to the collet 39 which is fitted on the electrode 20, and through the stack of carbon discs 41 to the grounded contact member 35. At the initial moment of contact of the contact member 35 with the grounded object, the carbon discs 41 are only in loose surface contact with each other, producing a high resistance in the circuit which restricts the current to a low value. Upon application of substantial pressure to the torch to press the same more intimately against the grounded object, the carbon discs 41 are compressed together which lowers the over-all resistance of the carbon pile to the point where sufficient current will flow through the circuit to energize the low-resistance relay 43 and draw its contact arm 44 into contact with the fixed member 46. This permits current to flow through the lead 45 connected to the 110-volt A. C. source, the relay arm 44, fixed contact 46, and lead 47 through the time-delay solenoid coil 48 and the lead 49A returning to the 110-volt A. C. source. Immediately the inert gas valve 52 is shifted to open position by solenoid 48, initiating the inert gas blanket about the electrode 20. As the operator reduces pressure on the contact member 35, the compressed carbon pile 41 will disassemble, thus increasing the circuit resistance and reducing the voltage and current to a minimum to prevent any arc at the point of contact between the contact member 35 and the grounded object or workpiece, thus avoiding any burning or marring of the workpiece.

The operator, after permitting a sufficient time to elapse during which the inert gas has been flowing through the conduit 53 and tube 14 into surrounding shielding relation with the electrode 20, hereinafter termed the pre-shielding period, strikes the arc by inverting the torch 10 and placing the tungsten electrode 20 in contact with the work. Upon completion of the welding cycle, the arc is broken by withdrawing the electrode 20 from proximate relation to the work, which breaks the circuit established through the low-resistance relay 43, lead 42, tube 14, head cylinder 15, barrel 18, collet 19 and electrode 20 and de-energizes the low-resistance relay 43 opening the contact thereof. After elapse of the predetermined delay time, the gas supply valve 52 is then closed, terminating the blanketing gas shield about the electrode 20. In this way, the electrode 20 is maintained in inert gas-blanketing relation during both the starting period of the operating cycle prior to striking the arc and the cooling off period of the electrode to prevent poor welding and electrode contamination with the surrounding atmosphere. The time-delay interval required for the gas supply valve 52 to close following de-energization of the time-delay solenoid 48 is adjusted so that the inert gas-blanketing shield is maintained during short intermittent periods when the welding cycle is terminated when such periods would be of insufficient time to permit necessary cooling of the electrode, and in a preferred embodiment, is of the order of 15 seconds.

Figure 4:
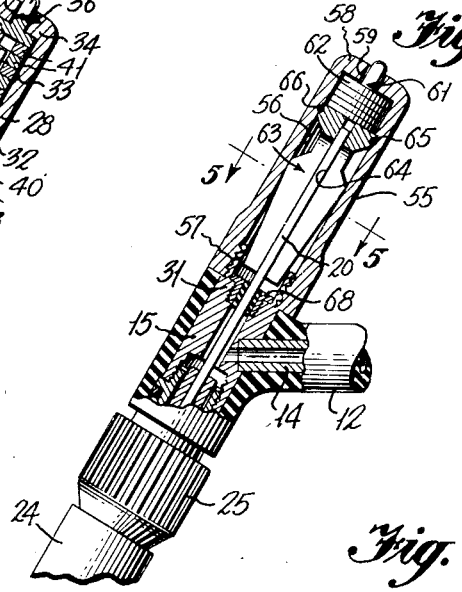
Figure 4 is a fragmentary side elevation of a second embodiment of the auxiliary variable resistor head with parts broken away to illustrate the variable resistor head in longitudinal section.
Figure 5:
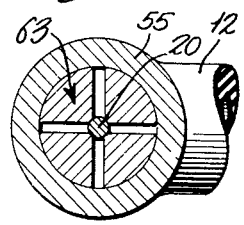
Figure 5 is a transverse section view taken along the line 5—5 of Figure 4.

In the modification disclosed in Figures 4 and 5, components corresponding to those illustrated in the first described embodiment are provided with the same reference characters. In this embodiment, the housing 55, which is of molded insulated material, is provided with an elongated bore 56 having an internally threaded open lower end 57 to permit the housing to be threadedly mounted onto the threaded nipple 31 of the head cylinder 15. The upper end of the housing 55 is provided with an end wall 58 centrally apertured, as indicated at 59, in order to receive the contact pin 60 of a contact member 61 having an integral bearing disc 62 disposed within the bore of the housing 55. A collet 63 extends from a point spaced inwardly of the bearing disc 62 and is disposed within the bore 56, the collet being provided with an aperture 64 which accommodates the end of the electrode 20 projecting above the head cylinder 15 with the bounding surface of the aperture contacting but not gripping the electrode. An O ring 65 is seated in a complementary groove provided in the base portion of the collet 63 and is likewise interfitted in an annular groove 66 formed in the interior wall of the bore 56 to hold the collet 63 against longitudinal displacement. Between the adjacent surfaces of the contact disc 62 of the contact member 61 and the collet 63 are located a plurality of carbon discs 67. In both this and the first described embodiment, a sealing block 68 may be threadedly mounted on the upper end of the cylinder head 15 to accommodate the electrode 20 while sealing the upper end of the axial bore 16 against escape of the inert gas into the bore of the housing members 28 or 55.

Figure 3:
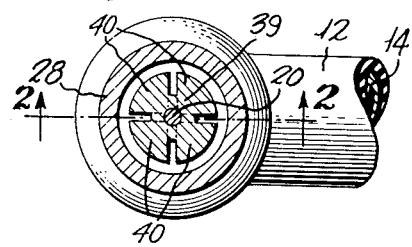
Figure 3 is a transverse section view taken along the lines 3—3 of Figure 2.

The second embodiment illustrated in Figures 4 and 5 operates in the same fashion as that illustrated in Figures 2 and 3. The essential difference between the two embodiments is that in the second embodiment the portion of the electrode 20 projecting above the cylindrical head 15 is not clamped by the collet 63 but is in sliding contact therewith. The electrical circuit through the pile of carbon discs 67 is established in this embodiment through the conductor tube 14, the cylinder 15, the barrel 18, the collet 19 and the electrode 20 to the collet 63, and thence through the surface contact of the collet 63 with the adjacent carbon disc 67 and through the pile of carbon discs to the contact member 61. The collet 63 forming the fixed stop against which the pile of carbon resistors 67 is compressed when the contact member 61 is pressed against the grounded object, is not held against longitudinal movement by clamping contact with the electrode 20 in this embodiment, but is so held by the O ring 66 interfitting facing grooves on the collet 63 and housing 55 to restrain the collet against movement. In this embodiment, therefore, the electrode is free to be longitudinally adjusted when portions of the electrode burn out or are consumed without requiring readjustment of the position of the resistor backing collet thereon.

While only preferred embodiments of the invention have been particularly shown and described, it is apparent that various modifications may be made in the invention without departing from the spirit and scope thereof, and it is desired, therefore, that only such limitations shall be placed thereon as are imposed by the prior art and are set forth in the appended claims.

I claim:

1. In a gas-blanketed arc welding apparatus comprising a torch having an electrode and a nozzle, an electrical circuit for passing welding current through said electrode and the work, a conduit for delivering gas to said nozzle, and a valve for controlling the supply of gas to said conduit, means extending above said torch and carried thereon for controlling said valve during shielding of the electrode prior to striking the arc and during cooling of the electrode comprising an exposed contact member movable in accordance with pressure exerted thereon upon engaging said contact member with a grounded object, variable electric resistance means electrically connected between said contact member and said electrode and associated with said contact member to vary the electrical resistance of said resistance means in response to pressure variations on said contact member, and time delay valve control means responsive to current variations in said electrical circuit caused by variation in the resistance of said resistance means for opening said valve immediately following elevation of the current in said circuit above a preselected minimum current value and maintaining said valve open continuously until a preselected time following reduction of the current in said circuit below said minimum current value.

2. In a gas-blanketed arc welding apparatus comprising a torch having an electrode and a nozzle, an electrical circuit for passing welding current through said electrode and the work, a conduit for delivering gas to said nozzle, and a valve for controlling the supply of gas to said conduit, means extending above said torch and carried thereon for controlling said valve during pre-shielding and cooling of the electrode comprising a housing projecting above said torch and carried thereon, a variable resistor responsive to variations of pressure thereon to vary the electrical resistance thereof, an electrically conductive contact member projecting from said housing to be contacted with a grounded object to close the circuit upon inversion of said torch and bearing on said resistor to vary the pressure thereon in accordance with pressure in said contact member, means electrically connecting said resistor between said contact member and said electrode to dispose said resistor in series circuit relation in said electrical circuit when said contact member is in engagement with said grounded object, and time delay valve control means responsive to current variations in said electrical circuit caused by variation in the resistance of said resistor for opening said valve immediately following elevation of the current in said circuit above a preselected minimum current value and maintaining said valve open continuously until a preselected time following reduction of the current in said circuit below said minimum current value.

3. In a gas-blanketed arc welding apparatus comprising a torch having an electrode and a nozzle, an electrical circuit for passing welding current through said electrode and the work, a conduit for delivering gas to said nozzle, and a valve for controlling the supply of gas to said conduit, means extending above said torch and carried thereon for controlling said valve during pre-shielding and cooling of the electrode comprising a tubular housing projecting from said torch in opposite relation to said nozzle, a series of carbon resistors supported in loose surface contact within said housing, an electrically conductive contact member slidably supported in said housing in engagement with one end of said series of carbon resistors and having a contact pin projecting from said housing to be contacted with a grounded object upon inversion of said torch to dispose said nozzle away from the work, means within said housing restraining the other end of said series of carbon resistors against movement away from said contact member and electrically connect said other end of said series of resistors with said electrode to dispose said series of resistors in series circuit relation in said electrical circuit when said contact pin is in engagement with said grounded object, and time delay valve control means responsive to current variations in said electrical circuit caused by variation in the resistance of said resistor for opening said valve immediately upon the application of sufficient pressure on said contact member to elevate the current in said circuit above a preselected minimum current value and maintaining said valve open continuously until a preselected time following reduction of the current in said circuit below said minimum current value.

4. In a gas-blanketed arc welding apparatus comprising a torch having an electrode and a nozzle, an electrical circuit for passing welding current through said electrode and the work, a conduit for delivering gas to said nozzle, and a valve for controlling the supply of gas to said conduit, means extending above said torch and carried thereon for controlling said valve during pre-shielding and cooling of the electrode comprising a tubular housing projecting from said torch in opposite relation to said nozzle, a series of carbon resistors supported in loose surface contact within said housing, an electrically conductive contact member slidably supported in said housing in engagement with one end of said series of carbon resistors and having a contact pin projecting from said housing to be contacted with a grounded object upon inversion of said torch to dispose said nozzle away from the work, means within said housing restraining the other end of said series of carbon resistors against movement away from said contact member and electrically connect said other end of said series of resistors with said electrode to dispose said series of resistors in series circuit relation in said electrical circuit when said contact pin is in engagement with said grounded object, normally open relay means having a relay coil in series in said electrical circuit adjusted to a threshold contact-closing current in excess of a preselected current value, said series of carbon resistors having a range of resistance variation in response to the state of compression thereof providing electrical current variation in said circuit extending above and below said pre-selected current value when said contact pin is in engagement with said grounded object, time delay solenoid means for opening and closing of said valve, means electrically intercoupling said solenoid means with the contacts of said relay means to energize said solenoid to open said valve immediately after said relay contacts are closed and maintain the valve open while said relay contacts are closed, and means restraining said solenoid means from closing said valve for a preselected time delay period following opening of said relay contacts.

5. A gas-blanketed arc welding apparatus comprising a torch having an electrode and a nozzle, an electrical circuit for passing welding current through said electrode and the work, a conduit for delivering gas to said nozzle, and a valve for controlling the supply of gas to said conduit, a tubular housing projecting from said torch in opposite relation to said nozzle, a series of carbon resistors supported in loose surface contact within said housing, an electrically conductive contact member slidably supported in said housing in engagement with one end of said series of carbon resistors and having a contact pin projecting from said housing to be contacted with a grounded object from inversion of said torch to dispose said nozzle away from the work, means within said housing restraining the other end of said series of carbon resistors against movement away from said contact member and electrically connect said other end of said series of resistors with said electrode to dispose said series of resistors in series circuit relation in said electrical circuit when said contact pin is in engagement with said grounded object, and time delay valve control means responsive to current variations in said electrical circuit caused by variation in the resistance of said resistor for opening said valve immediately following elevation of the current in said circuit above a preselected minimum current value and maintaining said valve open continuously until a preselected time following reduction of the current in said circuit below said minimum current value.

6. A gas-blanketed arc welding apparatus comprising a torch having an electrode and a nozzle, an electrical circuit for passing welding current through said electrode and the work, a conduit for delivering gas to said nozzle, and a valve for controlling the supply of gas to said conduit, a tubular housing projecting from said torch in opposite relation to said nozzle, a series of carbon resistors supported in loose surface contact within said housing, an electrically conductive contact member slidably supported in said housing in engagement with one end of said series of carbon reistors and having a contact pin projecting from said housing to be contacted with a grounded object upon inversion of said torch to dispose said nozzle away from the work, means within said housing restraining the other end of said series of carbon resistors against movement away from said contact member and electrically connect said other end of said series of resistors with said electrode to dispose said series of resistors in series circuit relation in said electrical circuit when said contact pin is in engagement with said grounded object, normally open relay means having a relay coil in series in said electrical circuit adjusted to a threshold contact-closing current in excess of a preselected current value, said series of carbon resistors having a range of resistance variation in response to the state of compression thereof providing electrical current variation in said circuit extending above and below said preselected current value when said contact pin is in engagement with said grounded object, time delay solenoid means for opening and closing of said valve, means electrically intercoupling said solenoid means with the contacts of said relay means to energize said solenoid to open said valve immediately after said relay contacts are closed and maintain the valve open while said relay contacts are closed, and means restraining said solenoid means for closing said valve for a preselected time delay period following opening of said relay contacts.

7. A gas-blanketed arc welding apparatus comprising a torch having an electrode and a nozzle, an electrical circuit for passing welding current through said electrode and the work, a conduit for delivering gas to said nozzle, and a valve for controlling the supply of gas to said conduit, a tubular housing projecting from said torch in opposite relation to said nozzle, a plurality of axially aligned carbon disc resistors stacked in loose surface contact with each other in coaxial relation within the housing adjacent the end thereof remote from said nozzle, an electrically conductive contact member slidably supported in said housing in engagement with the outermost one of said carbon discs and having a contact pin projecting from said housing to be contacted with a grounded object upon inversion of said torch to dispose said nozzle away from the work, stop means within said housing in electrical communication with said electrode and engaging the innermost one of said carbon discs to restrain the same against axial displacement when inward pressure is applied to said contact member and dispose said plurality of resistors in series circuit relation in said electrical circuit when said contact pin is in engagement with said grounded object, normally open relay means having a relay coil in series in said electrical circuit adjusted to a threshold contact-closing current in excess of a preselected current value, said plurality of carbon resistors having a range of resistance variation in response to the state of compression thereof providing electrical current variation in said circuit extending above and below said preselected current value when said contact pin is in engagement with said grounded object, time delay solenoid means for opening and closing of said valve, means electrically intercoupling said solenoid means with the contacts of said relay means to energize said solenoid to open said valve immediately after said relay contacts are closed and maintain the valve open while said relay contacts are closed, and means restraining said solenoid means from closing said valve for a preselected time delay period following opening of said relay contacts.

References Cited in the file of this patent

UNITED STATES PATENTS

| | | |
|---|---|---|
| 1,664,022 | Churchward | Mar. 27, 1928 |
| 2,060,772 | Moffett | Nov. 10, 1936 |
| 2,383,725 | Landis et al. | Aug. 28, 1945 |
| 2,510,207 | Behnke et al. | June 6, 1950 |